United States Patent

[11] 3,577,901

| [72] | Inventor | Earl E. Gray |
| | | Barrington, Ill. |
| [21] | Appl. No. | 749,869 |
| [22] | Filed | Aug. 2, 1968 |
| [45] | Patented | May 11, 1971 |
| [73] | Assignee | Bourns/Cai, Inc. |

[54] REMOTELY CONTROLLED FOCAL PLANE SHUTTER
10 Claims, 5 Drawing Figs.

[52] U.S. Cl. ................................................. 95/57,
                                                        95/55
[51] Int. Cl. .............................................. G03b 9/32
[50] Field of Search ............................... 95/55, 57

[56]                  References Cited
                  UNITED STATES PATENTS
| 2,253,084 | 8/1941 | Mihalyi ........................ | 95/57 |
| 2,309,300 | 1/1943 | Briechle et al. ............... | 95/57 |
| 2,435,835 | 2/1948 | Hineline ....................... | 95/57 |
| 3,087,401 | 4/1963 | Maurer et al. ................. | 95/57 |

*Primary Examiner*—Samuel S. Matthews
*Assistant Examiner*—Michael D. Harris
*Attorney*—Louis Bernat ABSTRACT: Each one of a pair of focal plane shutter curtains is mounted independently of the other. An exposure slit is formed between the trailing edge of one curtain and a leading edge of the other curtain. A gear train and a dual-action differential arrangement drives the two curtains to move the slit across the format area of a camera. The gear train is, in turn, controlled by electromagnetic clutch, brake, and antibacklash devices which are actuated sequentially to start the shutter curtain travel, to couple the two curtains together to prevent variations in slit width, and to stop the curtain at the end of the travel. By locking one gear and turning another gear in the differential, the slit width may be adjusted by displacing one curtain with respect to the other.

Patented May 11, 1971

INVENTOR.
EARL E. GRAY

BY

Patented May 11, 1971

INVENTOR.
EARL E. GRAY

BY Louis Bernat
ATTY.

REMOTELY CONTROLLED FOCAL PLANE SHUTTER

This invention relates to focal plane camera shutters, and more particularly — although not exclusively — to improvements in curtain shutters of a type which is especially well suited for use in remotely controlled aerial cameras.

Known focal plane cameras have employed shutters made from a curtain having one or more rectangular slits therein. The shutter curtain — and therefore the slit in the curtain — is pulled across a format area to expose photographic film which is behind the curtain. The exposure time is dependent upon the width of the slit and the speed at which the slit moves across the format area.

Various arrangements have been used to control the width of the slit and the travel speed of the curtain. For example, some cameras have used a single curtain having one or more formed slits therein, while other cameras have used two cooperating curtains with their ends spaced apart to form the slit. However, these arrangements have often achieved less that optimum results for a variety of reasons. For example, the curtains have often been controlled by unusually complex mechanical devices. Because of inertia and space limitations, the curtains have been slow acting. Also, it has been very difficult to remotely control the slit width and the curtain travel speed, with a resulting poor control over the exposure. These and other problems have resulted in unreliable operation and excessive curtain wear.

All of these problems are encountered in aerial cameras using focal plane shutters. In addition, aerial cameras are restricted by the size and weight limitations imposed upon all airborne equipment, and they must operate reliably, at high speed, and with accurate exposure controls.

Accordingly, an object of the invention is to provide new and improved focal plane shutters, and more particularly to provide improved aerial cameras. Here, an object is to provide superior means for remotely controlling focal plane curtain shutters.

Another object of the invention is to provide simplified focal plane shutters with very reliable high-speed operation.

Yet another object of the invention is to improve focal plane exposure characteristics by closely controlling the curtain travel velocity. In this connection, an object is to improve exposure characteristics by enabling a continuously and remotely adjustable control over the exposure slit width. More particularly, an object is to improve these and other characteristics by employing magnetic clutch couplings to preclude slit width variations during exposure.

Another object of this invention is tor provide an improved focal plane shutter assembly employing a differential gear means to afford a more accurate control over the exposure slit width. An object is to use the same differential gear means to control directional movement of the curtains.

A further object of this invention is to provide an improved focal plane shutter assembly for reducing curtain wear through a use of lightweight materials. Here an object is to reduce curtain wear by providing a novel slack-removing system that avoids placing a heavy tension upon the curtains — especially during long periods of storage when no power is applied to the system.

In keeping with one aspect of the invention, these and other objects are accomplished by means of an overlapping pair of shutter curtains which are separately wound on individually associated pairs of rollers. The ends of these two curtains are separated by a distance, which may be varied within limits, in order to form an adjustable width exposure slit. This way, the curtains may be unwound from their associated rollers at one end of the format area and wound on the rollers at the other end of the area. When the curtain is so wound, the slit is pulled across the format area to expose a photographic film in the area. When the rollers are wound in the opposite directions, the slit travels over the format area in the opposite direction, again to expose the photographic film.

A logic system develops operating signals which are used to control the movement of the curtains as they are wound from roller to roller in order to pull the slit back and forth across the format area. The logic system is, in turn, controlled by cam-operated switches which are synchronized with the position of at least an edge of the slit. The operating signals developed by the cam switches are applied to either one of a pair of magnetic clutches and to either one of a pair of magnetic brakes which control the application of power from a continuously running motor to the curtain rollers.

Among other things, the described system provides a novel tensioning arrangement. The shutter curtains never have any slack in them. Yet, there is no great mechanical strain because there is no heavy spring tension pulling upon the curtains. Especially, there is no heavy tension during long periods of nonuse. Moreover, lighter mechanical strain enables a use of lighter weight curtain materials which, in turn, reduces wear and increases reliability. The use of lightweight material also enables an increased operating speed because there is less inertia.

An exemplary structure embodying these and other principles, features, and advantages of the invention may be understood by reference to the accompanying drawings in which.

Figure 1:
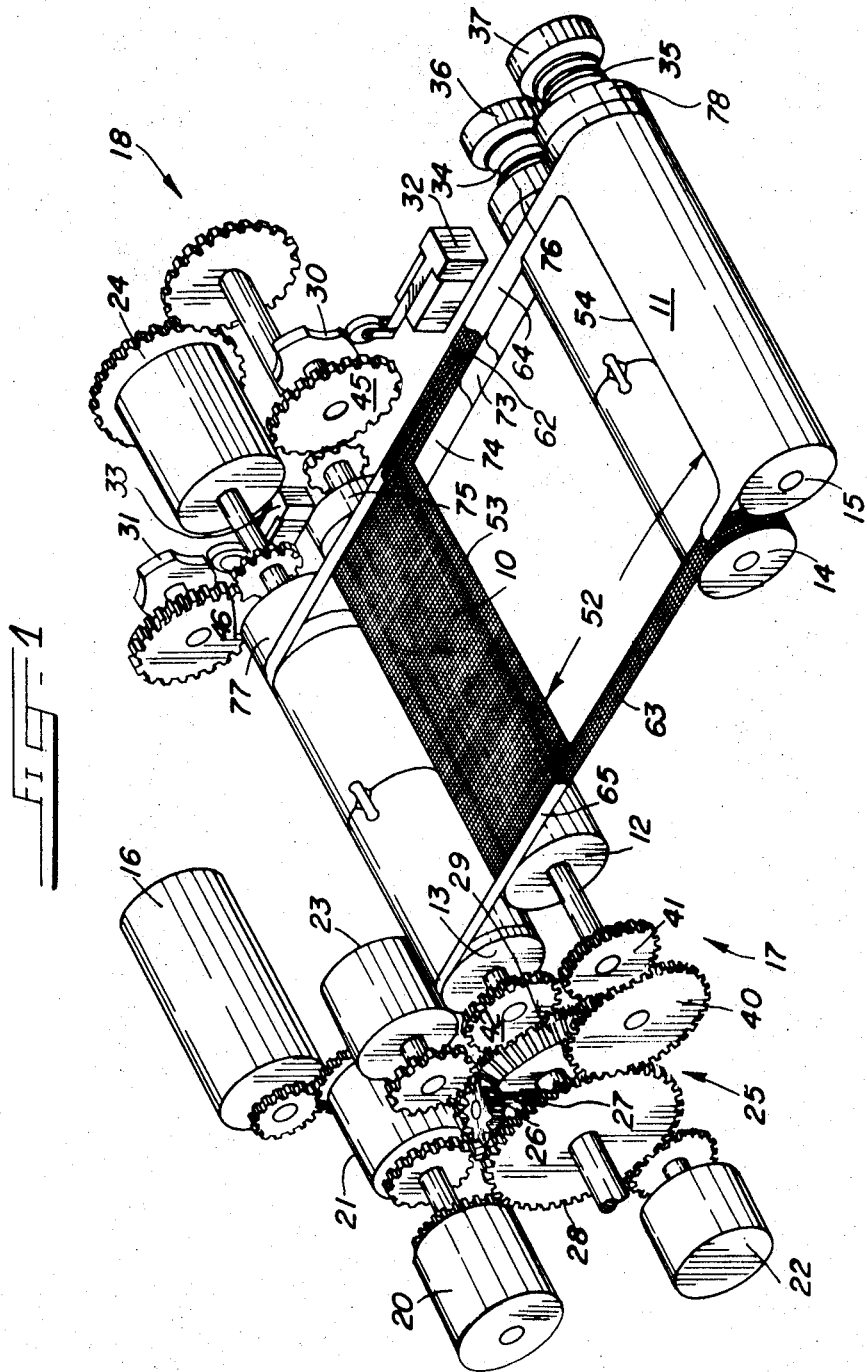
FIG. 1 is a perspective view of a focal plane shutter and associated mechanism.

In FIG. 1, a preferred embodiment of the invention is shown as including a pair of overlapping shutter curtains 10 and 11, each of which is wound upon an individually associated pair of takeup rollers, there being four such rollers 12, 13, 14 and 15. Thus, curtain 10 is wound upon a first driving roller 12 as it is pulled from a first follower roller 14. The other curtain 11 is similarly wound upon another driving roller 13 as it is pulled from another follower roller 15. For convenience of expression, the first curtain (and its associated rollers) could be called an "inner" and "bottom" curtain and rollers, while the other curtain (and its associated rollers) could be called an "outer" or "top" curtain and rollers. However, it would be an error to attach special significance to this use of these terms. Obviously, the question of which is "inner" or "outer," or "-top" or "bottom" is merely a matter of the viewpoint which is taken.

Briefly, the remaining components seen in FIG. 1 are a drive motor 16; a clutch, differential, and brake mechanism 17; and a mechanical logic, antibacklash, and tension control system 18. The motor 16 runs continuously while the camera is in use.

The clutches 20, 21, brakes 22, 23, and an antibacklash coupling 24 are constructed in a somewhat similar manner. Each of these devices includes a pair of surfaces (not shown) covered by a material having a high friction characteristic. These surfaces are brought together or moved apart by magnetic action means which are operated responsive to an application of electronic signals. The signals are generated in a predetermined sequence by a camera control device. The clutch operates to start the shutter travel; the antibacklash coupling operates to interconnect driving rollers 12 and 13; and the brakes stop the shutter travel. Thus, there is a cycle of sequential operations which start and stop the shutter travel without allowing any backlash in the gear trains or slack in the curtains.

A dual action means, in the form of a differential 25, performs the two functions of controlling the slit width and providing a directional curtain travel control. The differential includes a miter gear 26, which is fixed to a spider shaft 27, and two bevel gears 28, 29.

The logic equipment, at 18, includes a pair of shutter position logic cams 30, 31 which are synchronized with the physical positions of the edges of the slit. These cams 30, 31 control limit switches 32, 33, respectively, to indicate when the slit has reached the end of its travel with respect to the edges of the format areas.

The tension control system includes a pair of springs 34, 35 for giving a rotational bias to the follower rollers 14, 15. A pair of capstans 36, 37 provide means for making an adjustment of the tension applied to the rollers 14, 15 by the springs 34, 35. That is, the capstans 36, 37 slip until the tension of the springs 34, 35 equals the adjusted friction at the capstans, at which time the slippage ends.

The remaining component parts in the assemblies 17 and 18 will be understood best from a description of how they operate. For this description, reference may be made to either FIG. 1 or FIG. 2, which will be referred to interchangeably.

In greater detail, the motive power for driving the shutter system is supplied by the drive motor 16. In a preferred embodiment, this motor 16 is a fully governed DC electric motor that runs continuously once the electrical power is applied to the system. The electrical power is obtained from any suitable power supply 39 which also provides operational timing signals. The physical driving power represented in FIG. 2 by dashed lines is applied from the motor 16 through either one of the clutches 20, 21 to the curtain driving rollers 12 and 13 via the differential mechanism 25 and the gears 40, 41 and 42.

The electromagnetic friction brakes 22 and 23 are coupled to the bevel gears 28, 29, respectively, of the differential 25 in order to apply a stopping force to the roller drive system. These brakes are selectively operated responsive to an actuation of the switches 32 and 33 when the cams 30, 31 reach the end of their travel. These cams are, in turn, actuated at the end of the curtain travel by gear trains 45, 46 which are coupled to rollers 12 and 13, respectively.

Figure 2:
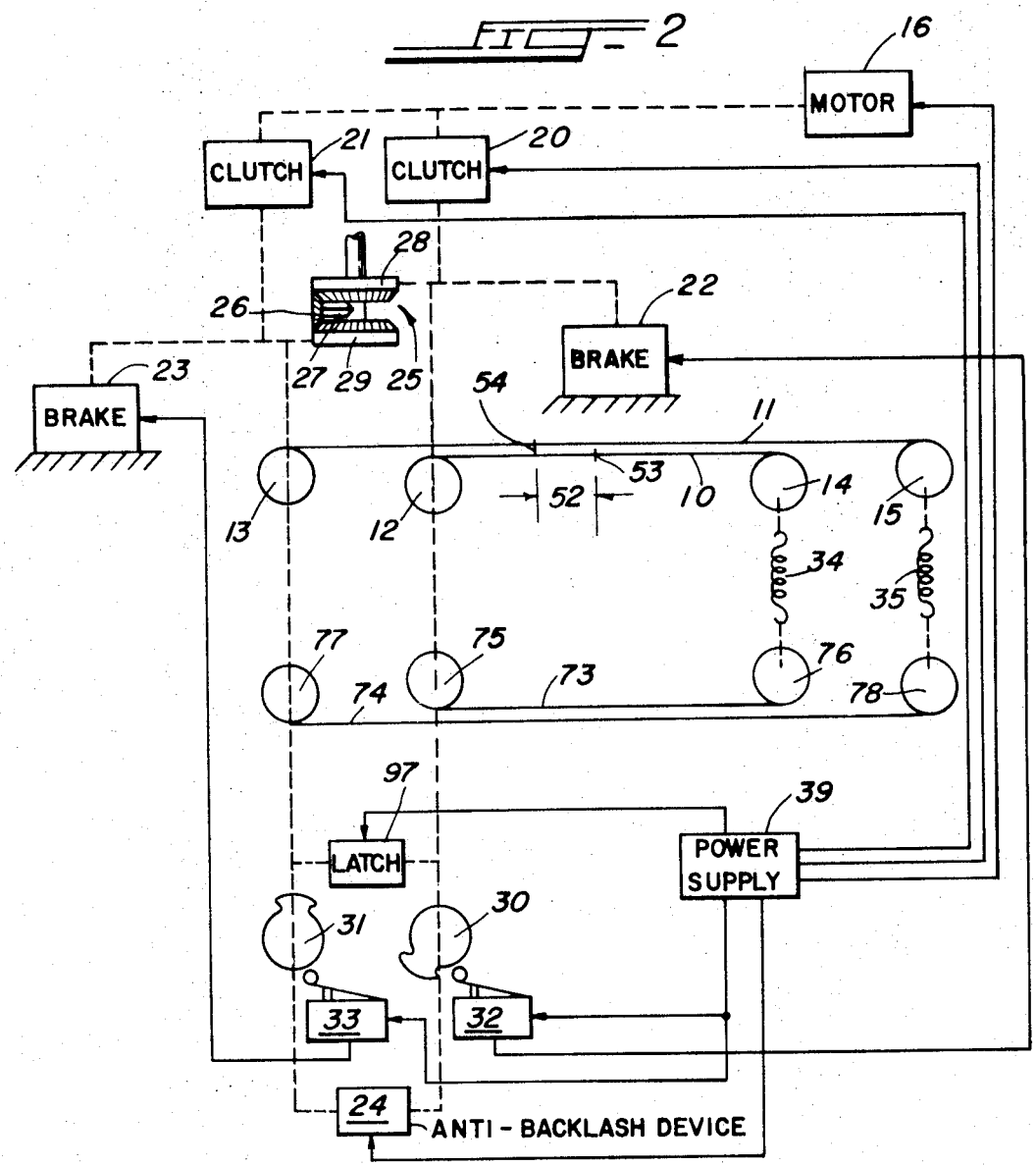
FIG. 2 is a schematic representation of the rollers and control equipment used to pull the shutters across the format area.

The shutter control mechanism of FIGS. 1 and 2 operates this way. When the clutch 20 is energized, the physical driving power is applied from motor 16 directly to the bevel gear 28 and through idler gear 26 to another bevel gear 29. Suitable gear trains (represented by the gears 40, 41, and 42) connect the bevel gears 28 and 29 to the driving rollers 12 and 13, respectively. This causes the rollers 12, 13 to rotate simultaneously, at the same speed, and in one direction — which may be clockwise, for example. Thus, the shutter curtains 10 and 11 are pulled from rollers 12 and 13 to rollers 14 and 15. Consequently, the exposure slit 52 (defined by curtain edges 53, 54) is moved across the format area. Conversely, an energizing of the clutch 21 causes the driving rollers 12 and 13 to rotate in the opposite direction — counterclockwise under the above assumptions. This direction of rotation pulls the curtains from the follower rollers 14 and 15 to the driving rollers 12 and 13, and the exposure slit 52 moves across the format area in the reverse direction.

This bidirectional curtain motion allows a photographic exposure to be made on each passage of the slit across the format area, thereby obviating the need for a rewind cycle and a capping of the lens or otherwise a closure of the shutter. Also, since a picture is taken on each curtain travel — instead of having a rewind travel — the picture-taking rate is increased, and the curtain wear is reduced.

Figure 3:
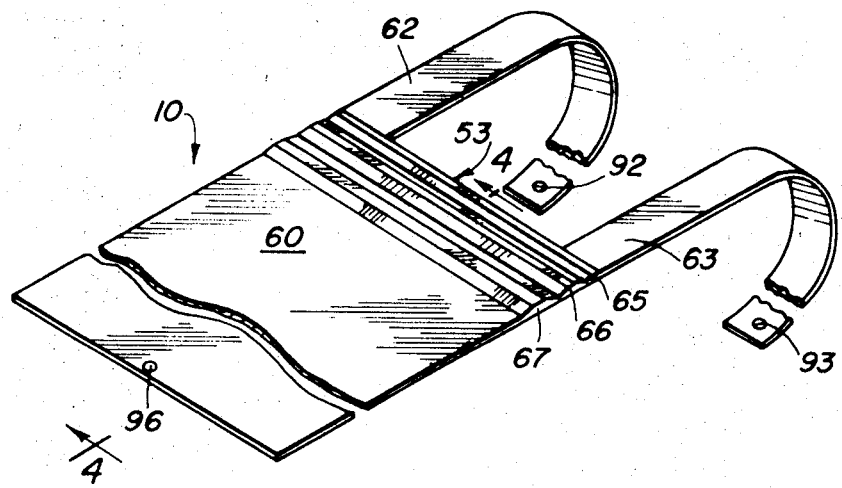
FIG. 3 is a perspective view of a shutter curtain.

As shown in FIG. 3, each curtain includes a body portion 60 with a reinforced leading edge 53 having extension bands 62, 63 attached thereto. The bands 62, 63, and edge 53 form an open part in the curtain. The two curtains 10, 11 are mounted facing in opposite directions; or, as shown in FIG. 1, the bands 62, 63 of inner curtain 10 are attached to inner follower roller 14, and the bands 64, 65 of outer curtain 11 are attached to outer driving roller 13.

This use of individual rollers, for each curtain, at both sides of the format area allows very long curtains to be stored efficiently, thereby minimizing the space required for the inventive shutter assembly. The extension bands 62, 63 are very long with respect to the format area. A substantial length of each band and the associated curtains are wound up on the respective rollers at the end of each exposure cycle. Thus, there can be a curtain acceleration during the interval before the exposure slit reaches and enters the format area. Therefore, a proper mechanical design can provide an optimum pattern of acceleration during the ensuing cycle of operation, thus minimizing the exposure time and maximizing the exposure rate.

In keeping with an aspect of the invention, the overlapping arrangement of the separately mounted curtains allows an adjustable slit 52 to be formed within the open portions of the two curtains and between the oppositely facing edges 53 and 54 of the combination of curtains. The width of the exposure slit 52 is changed, under remote control, by moving one curtain with respect to the other. To do this, the spider shaft 27 of the differential mechanism 25 is rotated while one of the brakes 22, 23 holds one of the bevel gears 28, 29 locked. The idler gear 26 pushes against the stationary bevel gear and turns the nonlocked bevel gear in order to pull the nonlocked curtain to open or close the exposure slit by controlled amounts. This control makes the same type of adjustment of slit width regardless of which brake is operated. For example, with the system illustrated in FIG. 1, a clockwise rotation of the spider shaft narrows the slit 52 while a counterclockwise rotation of the shaft widens slit 52.

This means for making a slit width adjustment offers improved control and reduced backlash, as compared with the means used in the prior art devices. Thus, the inventive device is especially well adapted for remote control operations.

Figure 4:
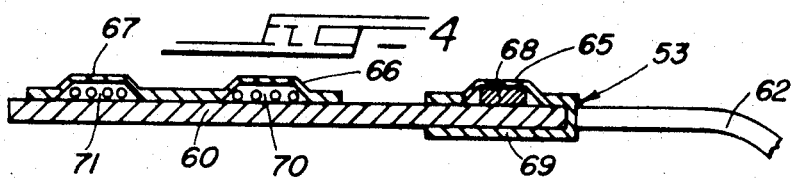
FIG. 4 is a partial cross-sectional view taken along line 4—4 of FIG. 3.

To enable a use of a relatively thin curtain material, a stiffening means is added to the slit edge, as illustrated in FIG. 4. Here, the reinforcing members 65, 66 and 67 are placed across the curtain body 60 at and near the slit forming edge. In a preferred embodiment of the invention, the stiffening rib, at the leading edge of the curtain, includes a stainless steel strip 68 having dimensions which are of the order of 0.008 inch in thickness and 0.016 inch in width. The rib 68 is fastened to the curtain body 60 by means of a suitable adhesive and an adhesively held cover 69 (of some tough, flexible material such as nylon) covers rib 68, passes around the curtain edge 53, and under the curtain body 60.

Additional curtain reinforcement is supplied by members 66, 67 which include two groups of stainless steel tubes 70, 71 positioned in side-by-side relationship and extending across the width of the curtain body 60. These tubes may be attached to the curtain body 60 by a suitable adhesive and covering means which is similar to the cover 69. The preferred embodiment of the invention uses four tubes in each group at 70, 71, with each tube having an outside diameter of approximately 0.012 inch.

In addition to stiffening the edges of the exposure slit 52, this method of reinforcement assists in uniformly distributing the load from extension bands 62, 63 across the slit edge.

A novel feature of this invention involves a use of tension tapes to remove all slack from the shutter curtains without placing an undue strain upon the curtain material. As shown in FIGS. 1 and 2, nonelastic tension tapes 73 and 74 are arranged to counterbalance the shutter curtains 10 and 11, respectively. Each of these tapes is wound up on its own individually associated takeup spools; that is, an inner tension tape 73 is alternately wound up on inner spools 75 and 76, while outer tape 74 is alternately wound up on outer spools 77 and 78.

The tension tape takeup spools 75, 77 are associated with the curtain driving rollers 12 and 13, respectively. The takeup spools 76, 78 are associated with the follower rollers 14, 15, respectively. The takeup spools 75, 77 are firmly attached to the shafts of the associated driving rollers 13 and 12. However, the spools 76 and 78 are flexibly attached to their respective follower rollers 14, 15 by means of the tension springs 34 and 35. Thus, each follower roller may rotate at a speed which is slightly different than the speed of its associated takeup spool and vice versa — depending upon the tension of the attaching spring.

To more fully appreciate the reasons for using the flexible coupling provided by the springs 34, 35, consider only the interrelationship of the shutter curtain 10 and its associated tension tape 73. When the curtain 10 is fully wound on its driving roller 12, the tension tape 73 is wound on its takeup spool 76. Thus, at the start of the next exposure cycle, the follower roller 14 must turn more rapidly than the driving roller 12 due to the differences between the effective diameters of the empty and full rollers 14, 12, respectively. Simultaneously, and for a similar reason, tape spool 75 must turn more rapidly than spool 76. Therefore, the tension spring 34, coupled between roller 14 and spool 76, provides a resisting force to restrain the rotation of the spool. The follower roller 14 turns faster than the driver roller 12, while the spool 75 turns faster than spool 76. Near the midpoint of the exposure cycle, all rollers and spools are rotating at about the same speed, and the tension in spring 34 is nearly zero. From this midpoint to the end of the cycle, there is an opposite effect, and a tension is wound into spring 34. This stored spring tension is used during the next ensuing exposure cycle. A similar tension control action takes place simultaneously in the outer curtain assembly.

The tensions in springs 34 and 35 are individually adjustable by means of the capstans 36 and 37, respectively, as shown in FIG. 1.

An important advantage resulting from the use of this novel tensioning method is that there never is any severe tension upon the shutter curtains. The springs 34 and 35 provide only the tension required to remove the slack from the curtains. This curtain tension is much less than the tension forces applied by the powerful curtain roller springs commonly used in prior art shutters. Therefore, curtain life is greatly increased. Also, the novel tensioning device allows the use of curtain suspension components having a much lower inertia — and this results in higher shutter speed capability.

Figure 5:
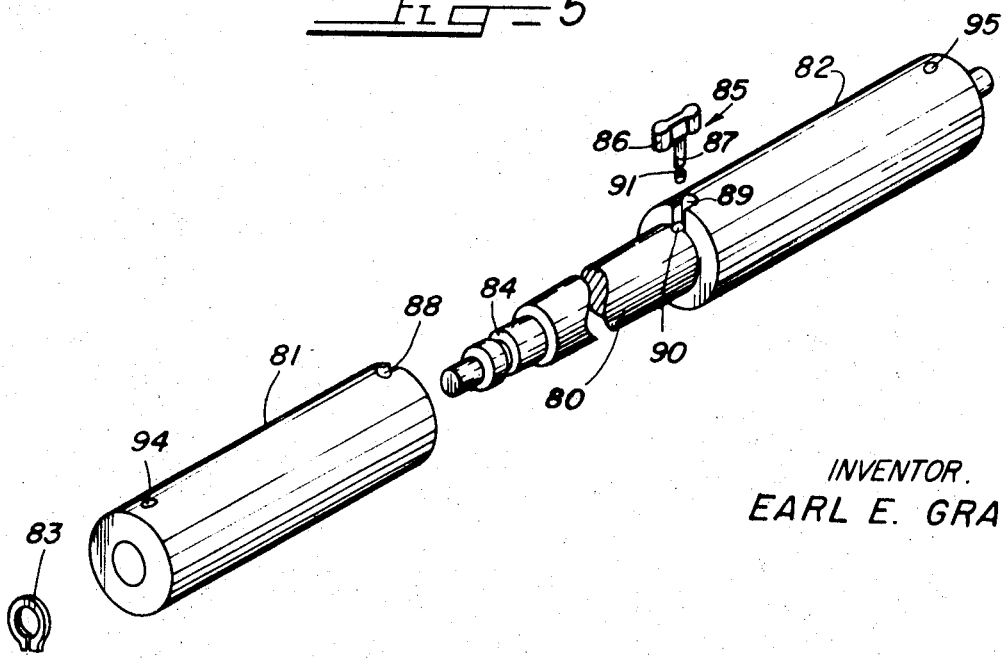
FIG. 5 is an exploded, perspective view of a shutter curtain roller assembly.

Another feature of the invention involves the use of universal pivot mechanism, shown in FIG. 5, and previously described in U.S. Pat. No. 3,087,401. This mechanism compensates for any variations in the distances between the points where the shutter curtains are attached to their respective rollers. The use of this pivot mechanism in combination with the novel tensioning and antibacklash mechanisms of the invention is highly advantageous.

In greater detail, the curtain roller of FIG. 5 is shown as including an inner shaft portion 80 and two concentric outer sleeves 81, 82. These sleeves are held on the inner shaft 80 by a pair of retaining rings — one of which is shown at 83. This ring is adapted to fit into the groove 84 in the shaft. Initially, these sleeves 81, 82 are free to rotate, relative to one another, on the shaft 80.

To prevent such an unrestrained rotation, a universal pivot mechanism 85 is slipped into keyed slots in the sleeves. This pivot mechanism includes a head portion 86 and a shank portion 87. The pivot head 86 is adapted to fit into the slots 88, 89 in the sleeves. The shank 87 passes through a hole 90 in the shaft 80. The shank is retained by means of a retaining ring (not shown) adapted to fit into groove 91. Thus, the sleeves 81 and 82 are allowed to have a small, restrained, rotary movement relative to one another and to shaft 80. Such a small movement is enough to compensate for variations in distances between the points where the curtains are attached to their respective rollers.

It is only necessary to provide the universal pivot means in the roller having the extension bands 62, 63 attached thereto. These bands are attached by means of screws running through dimpled holes 92, 93 in the bands 62, 63 and turned into the countersunk, tapped holes 94, 95 in the sleeves 81 and 82. The body portion 60 of each shutter curtain is similarly attached to its associated roller by means of a single screw running through hole 96 located midway between the side edges of the curtain. Therefore, this body portion 60 may be attached to a one-piece roller which does not require a universal pivot mechanism.

The shutter operates this way. In FIG. 2, the power off condition is the initial state which occurs before the system is energized by camera power supply 39. Both clutches 20, 21 and both brakes 22, 23 are disengaged. The shutter curtains are held in place by an electromechanical latch mechanism 97 which locks only the rollers of one curtain so that a width adjustment of the exposure slit 52 may be made by repositioning the other curtain that is not locked. The set of rollers which is locked by the mechanism 97 is determined by the position of the slit 52. If the curtains are wound on driving rollers 12 and 13, the inner curtain rollers 12 and 14 are locked. The slit adjustment is made by repositioning the slit edge 54 of outer curtain 11. Conversely, if the curtains are wound on the follower rollers 14 and 15, the outer curtain rollers 13 and 15 are locked. The slit edge 53 of inner curtain 10 is adjusted. Thus, in the power off condition, an adjustment of the slit width is always made by moving the trailing edge of the slit with respect to the leading edge, as viewed from the direction of curtain travel during the next exposure cycle.

Assume now that the curtains are wound on driving rollers 12 and 13 so that the exposure slit 52 is at the left side (as viewed in FIG. 2) of the format area. When the power is turned on, the brake 22 is engaged and the electromechanical latch 97 is disengaged responsive to signals applied from the camera power supply 39 through switch 32 which is closed by cam 30. Thus, the inner curtain rollers 12 and 14 which were held by latch 97 are now held by brake 22. If desired, the slit adjustment is accomplished while the brake is applied.

If the assumption had been that the curtains are wound on follower rollers 14 and 15, brake 23 is engaged when latch 97 is disengaged after the power is applied to the system. The selection of this brake is made responsive to the receipt of a signal applied through switch 33 which is closed by the cam 31. Thus, the outer shutter curtain rollers 13 and 15 are held by brake 23, and the slit width adjustment is made by moving curtain 10 and repositioning the edge 53.

In addition, the application of power causes the drive motor 16 to accelerate until it reaches its governed operating speed. The antibacklash device 24 is engaged, and the shutter is ready for its operating cycle which is initiated by a trip pulse supplied by the power supply 39.

Assume that the exposure slit 52 is on the driving roller side of the format area. The shutter trip pulse causes brake 22 to disengage and clutch 20 to engage, thereby applying the motor's power to the driving rollers 12 and 13. The curtains are accelerated to a constant exposure velocity before the leading edge of exposure slit 52 — edge 53 in this case — enters the format area. Thus, the slit crosses the format area at a constant velocity.

When the trailing edge 54 of the exposure slit reaches the opposite side of the format area, cam 31 closes switch 33 which applies the brake 23 and disengages the clutch 20 to stop the shutter travel. Brake 23 remains engaged until another shutter trip pulse is received. This pulse releases the brake 23 and engages the clutch 21 thus causing the above-described cycle to be repeated, but with the curtain travel in the opposite direction.

It has been found, experimentally, that the curtains always decelerate and stop at the end of very nearly the same time interval after each application of the braking force. Hence, if the brakes are applied at a specific location along the length of curtain travel, the curtains always come to rest at almost the same physical position — within close tolerance and without further external control. Thus, there is no need for applying a physical limitation upon the curtain movement.

The specific time during the curtain travel which is selected for applying the braking force is determined when cams 30, 31 operate the switches 32, 33. The position of each cam is always synchronized with the position of the edge of the exposure slit 52 formed by its associated curtain. That is, the cam 31 is synchronized with the edge 54, and the cam 30 is synchronized with the position of the edge 53. Thus, if a slit width adjustment is made by moving one of the driving rollers, it necessarily adjusts the position of the corresponding cam, since the cams are coupled to the rollers. Therefore, each cam may be positioned to close its associated brake-actuating switch when the corresponding trailing edge reaches a certain location with respect to an edge of the format area.

The various components illustrated here, are shown for the purposes of illustration only. As will be appreciated by those skilled in the art, the actual positions of such components may form a much more compact arrangement. Therefore, these and other similar changes may be made without affecting the inventive concept. Accordingly, the appended claims are to be construed to cover all equivalents falling within the true scope and spirit of the invention.

I claim:

1. A focal plane shutter device comprising a format area in which photographic film is exposed, two pairs of rollers, each of said pair of rollers including a driving roller on one side and a follower roller on the other side of said format area, first and second curtains having ends which are separated by a distance defining an exposure slit, each of said curtains being mounted on an individually associated one of said pair of rollers by being attached at one end to a driving roller and at the other end to a follower roller, tensioning means independently connecting each of said driving rollers to its associated follower roller for restraining the movement of said follower rollers and precluding slack in said curtains, said tensioning means comprising substantially nonelastic tape means individually connected between each of said driving rollers and the associated follower rollers, and adjustable tension means for connecting said tape means to said associated follower rollers, and driving means for rotating said two driving rollers simultaneously at equal speeds for moving said curtains across said format area, said driving means comprising motor means selectively coupled to a differential means, said differential means being coupled to said driving rollers to thereby effect alternate bidirectional rotation of said driving rollers, and means responsive to operation of said differential for adjusting the width of said slit by selectively rotating of one of said driving rollers with respect to the other.

2. The shutter device of claim 1 wherein said means for selectively coupling said motor to said differential comprises first selectively actuatable clutch and brake mechanisms connected to one side of said differential means, and second selectively actuatable clutch and brake mechanism connected to the other side of said differential means.

3. The shutter device of claim 1 and means comprising a universal pivot in at least one of said rollers to compensate for variations in the points at which said shutter curtains are attached to their respective rollers.

4. The shutter device of claim 1 further comprising control means connected to said driving rollers and operated in a specific spatial relationship with respect to opposing edges of said shutter curtains, and electrical switching means operated responsive to said last-named control means for setting the limits of curtain travel.

5. The shutter device of claim 1 further comprising electromagnetic coupling means for interconnecting the two driven rollers associated with said pair of curtains to preclude variations in slit width responsive to backlash in said driving means.

6. In a focal plane shutter assembly having a pair of overlapping shutter curtains with rectangular openings disposed therein to form an exposure slit between a pair of opposing edges of said curtains, said curtains being wound upon individually associated rollers suitably mounted on opposite sides of said format areas, the improvement therein comprising:

a first pair of said rollers positioned parallel to and on opposite sides of said format area and operatively associated with an outer one of said shutter curtains, said first pair of rollers comprising a first driving roller and a first follower roller;

a second pair of said rollers operatively associated with an inner one of said shutter curtains and comprising a second driving roller and a second follower roller, each of said second pair of rollers positioned parallel to a corresponding one of said first pair of rollers but between it and said format area;

tensioning means connected between each of said driving rollers and its associated follower roller to restrain the movement of said follower roller and to remove slack from the shutter curtain attached thereto, said tensioning means including substantially nonelastic flexible tape means connected to each of said driving rollers and adjustable spring means connecting said tape means to said associated follower rollers; and driving means for moving said curtains simultaneously and at equal speeds across said format area, said driving means comprising first and second gear trains coupled, respectively, to said first and second driving rollers, differential means having opposite sides connected, respectively, to said first and second gear trains, selectively actuatable clutch means coupled to said differential means, motor means alternately coupled to said opposite sides of said differential means through said clutch means, and selectively actuatable brake means coupled to said driving rollers.

7. The improvement in a focal plane shutter assembly as set forth in claim 6 wherein one roller in each of said first and second pairs of rollers comprises: an inner shaft portion and an outer sleeve portion concentric therewith, said sleeve portion comprising a first sleeve section and a second sleeve section pivotally joined therewith, and universal pivot means in at least said one roller for compensating for the differences in spacing between the points where said shutter curtains are attached to their respective rollers, said universal pivot means comprising a T-shaped coupling member having a shank portion pivotally positioned in said inner shaft portion of said roller and a head portion pivotally joining said sleeve sections of said roller together.

8. The focal plane shutter assembly of claim 6 and antibacklash means interconnecting said first and second driving rollers for precluding slit width variations responsive to backlash in said gear trains.

9. A focal plane shutter assembly comprising a pair of independently mounted curtains having edges separated by a predetermined amount to form an exposure slit, each of said curtains being wound upon an individually associated pair of rollers for bidirectionally transporting said slit across a predetermined exposure area, means for applying rotary power via a gear train to at least one of said rollers for moving said slit across said area, and means for interconnecting at least one roller associated with each of said curtains for substantially eliminating backlash in said gear train.

10. The assembly of claim 9 and a plurality of separate electromechanical means for selectively applying said rotary power and completing said interconnection, and means for operating each of said electromechanical means in a predetermined sequence to adjust the width of said slit and thereafter preserve said adjustment during the transportation of said curtains.

UNITED STATES PATENT OFFICE
CERTIFICATE OF CORRECTION

Patent No. 3,577,901      Dated May 11, 1971

Inventor(s) Earl E. Gray

It is certified that error appears in the above-identified patent and that said Letters Patent are hereby corrected as shown below:

Column 8, line 55, after "area" insert -- to expose said area each time that said curtians cross said area in either of said directions --; same line 55, after "for" insert -- bidirectionally --; line 56, after "for" insert -- bidirectionally --; line 59, after "train" insert -- and slack in the curtains --.

Signed and sealed this 23rd day of May 1972.

(SEAL)
Attest:

EDWARD M. FLETCHER, JR.
Attesting Officer

ROBERT GOTTSCHALK
Commissioner of Patents